(12) United States Patent
Thomas et al.

(10) Patent No.: US 6,550,565 B2
(45) Date of Patent: Apr. 22, 2003

(54) VARIABLE ROAD FEEDBACK DEVICE FOR STEER-BY-WIRE SYSTEMS

(75) Inventors: Steven Mark Thomas, Saginaw, MI (US); Richard Allen Devers, Linwood, MI (US); William David Cymbal, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/785,516

(22) Filed: Feb. 16, 2001

(65) Prior Publication Data

US 2001/0032749 A1 Oct. 25, 2001

Related U.S. Application Data

(60) Provisional application No. 60/183,597, filed on Feb. 18, 2000.

(51) Int. Cl.⁷ .................. B62D 5/04; F16F 9/53
(52) U.S. Cl. ............. 180/402; 180/444; 188/267.2
(58) Field of Search .................. 180/402, 403, 180/407, 421, 422, 446, 443, 444; 345/156, 161, 163, 168; 244/223; 434/45; 188/267.1, 267.2, 290

(56) References Cited

U.S. PATENT DOCUMENTS

| | | | | |
|---|---|---|---|---|
| 5,269,397 A | * | 12/1993 | Kawamoto et al. | 188/290 |
| 5,347,458 A | * | 9/1994 | Serizawa et al. | 180/402 |
| 5,460,252 A | * | 10/1995 | Kosugi et al. | 188/291 |
| 5,517,096 A | | 5/1996 | Shtarkman et al. | 318/434 |
| 5,667,715 A | | 9/1997 | Foister | |
| 5,668,722 A | | 9/1997 | Kaufmann et al. | |
| 5,823,309 A | | 10/1998 | Gopalswamy et al. | |
| 5,845,752 A | | 12/1998 | Gopalswamy et al. | |
| 5,848,678 A | | 12/1998 | Johnston et al. | |
| 5,896,942 A | * | 4/1999 | Bohner et al. | 180/402 |
| 5,896,965 A | | 4/1999 | Gopalswamy et al. | |
| 6,082,482 A | * | 7/2000 | Kato et al. | 180/402 |
| 6,283,859 B1 | * | 9/2001 | Carlson et al. | 463/36 |
| 6,298,960 B1 | * | 10/2001 | Derr | 188/290 |
| 6,318,522 B1 | * | 11/2001 | Johnston et al. | 188/267.2 |
| 6,339,419 B1 | * | 1/2002 | Jolly et al. | 345/156 |

FOREIGN PATENT DOCUMENTS

| | | |
|---|---|---|
| EP | 0 442 570 A | 8/1991 |
| EP | 0 522 924 A | 1/1993 |
| EP | 0 726 193 A | 8/1996 |
| EP | 0 776 813 A | 6/1997 |
| EP | 0776813 * | 6/1997 |
| GB | 2 351 953 A | 1/2001 |
| JP | 10 171542 A | 6/1998 |

* cited by examiner

Primary Examiner—Anne Marie Boehler
(74) Attorney, Agent, or Firm—Edmund P. Anderson

(57) ABSTRACT

A variable road feedback device (20) for a steer-by-wire system (50) comprises a housing (31) that contains a magnetorheological fluid (32), a magnetic field generator (34) for generating a variable magnetic field within the housing (31) in order to vary the viscous resistance of the magnetorheological fluid (32) therein, and a rotor (24) rotatably mounted within the housing (31) that rotates through the magnetorheological fluid (32) and is responsive to the variable viscous resistance thereof.

19 Claims, 3 Drawing Sheets

VARIABLE ROAD FEEDBACK DEVICE FOR STEER-BY-WIRE SYSTEMS

CROSS REFERENCE TO RELATED APPLICATION

This application claims the benefit of U.S. Provisional Patent Application Ser. No. 60/183,597, filed Feb. 18, 2000, the entire contents of which are incorporated herein by reference.

TECHNICAL FIELD

This disclosure relates to steer-by-wire systems, and more particularly, to steer-by-wire systems with variable road feedback.

BACKGROUND

Conventional vehicular steering systems have an articulated mechanical linkage connecting the steering wheel to the steerable road wheels. Even with power assist, the operator of such a mechanically linked vehicle can generally feel the forces of the road against the steerable road wheels through the steering wheel. Indeed, this is a desirable feature of mechanical linkage steering that is sought out by operators and purchasers of high performance vehicles, as indicated by the popularity of so-called "rack-and-pinion" steering.

With conventional mechanical linkage steering, the road forces felt in the steering wheel give the operator feedback useable to anticipate and control the vehicle. If this feedback is removed or substantially reduced, such as in the case of over-assisted or "mushy" power steering systems, the operator will have the uncomfortable feeling of being separated from the road wheels without sufficient sensory information to maintain precise control, and will therefore tend to oversteer the vehicle in demanding situations such as sharp or sudden turns.

A steer-by-wire steering system is defined as a steering system lacking a direct articulated mechanical linkage for connecting a steering wheel with a set of steerable road wheels. Such systems are desirable because they permit vehicle designers great latitude in the use of space that would normally be taken up by mechanical steering linkages. In effect, the steering wheel becomes a sophisticated type of joystick.

Accordingly, it is desirable to provide the operator of a vehicle equipped with steer-by-wire with feedback of road forces, or "road feel", comparable to that of a vehicle equipped with conventional mechanical steering.

SUMMARY

In an exemplary embodiment, a variable feedback device for a steer-by-wire system comprises a housing that contains a magnetorheological fluid, a magnetic field generator for generating a variable magnetic field within the housing in order to vary the viscous resistance of the magnetorheological fluid therein, and a rotor rotatably mounted within the housing that rotates through the magnetorheological fluid and is responsive to the variable viscous resistance thereof.

A steer-by-wire system comprising the variable feedback device has multiple sensors for generating input signals, including a steering column sensor for sensing changes in position or torque of a steering wheel and a wheel sensor for sensing changes in position or torque of a steerable vehicle wheel. The system also includes an electric power steering motor coupled to a steering system for assisting the vehicle operator, and a device housing. Contained within the device housing are a magnetorheological fluid, a magnetic field generator adapted to produce a magnetic field within the magnetorheological fluid, and a rotor rotatably mounted within the device housing, wherein the rotor is responsive to the resistance of the magnetorheological fluid.

DESCRIPTION OF A PREFERRED EMBODIMENT

Figure 1:
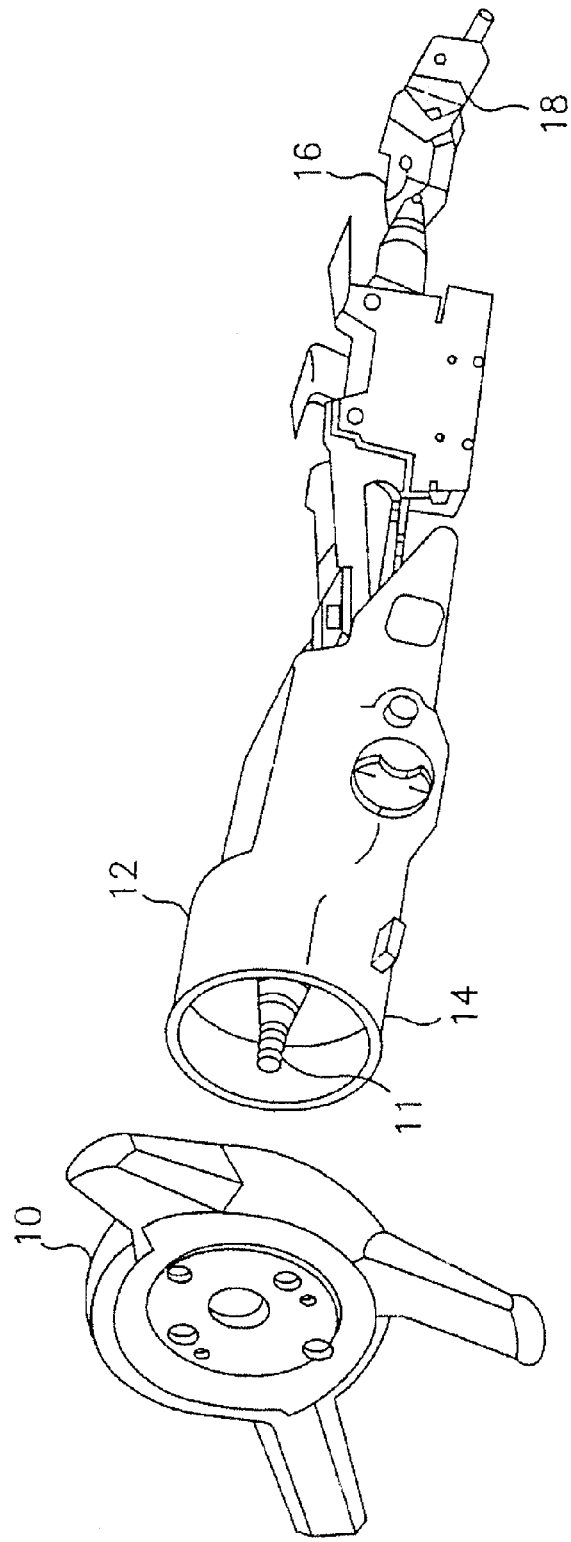
FIG. 1 is a perspective view of a prior art mechanical steering system.

Referring to FIG. 1, a typical prior art steering system is generally depicted. A steering wheel 10 is connected to a steering shaft 11 and covered by an upper cover 12 and a lower cover 14. A universal joint 18 is coupled to the steering shaft 11. The universal joint 18 is connected to a rack-and-pinion steering rack (not shown), which is coupled, in turn, to a pair of steered road wheels (also not shown). A direct articulated mechanical connection exists throughout the prior art steering system.

Figure 2:
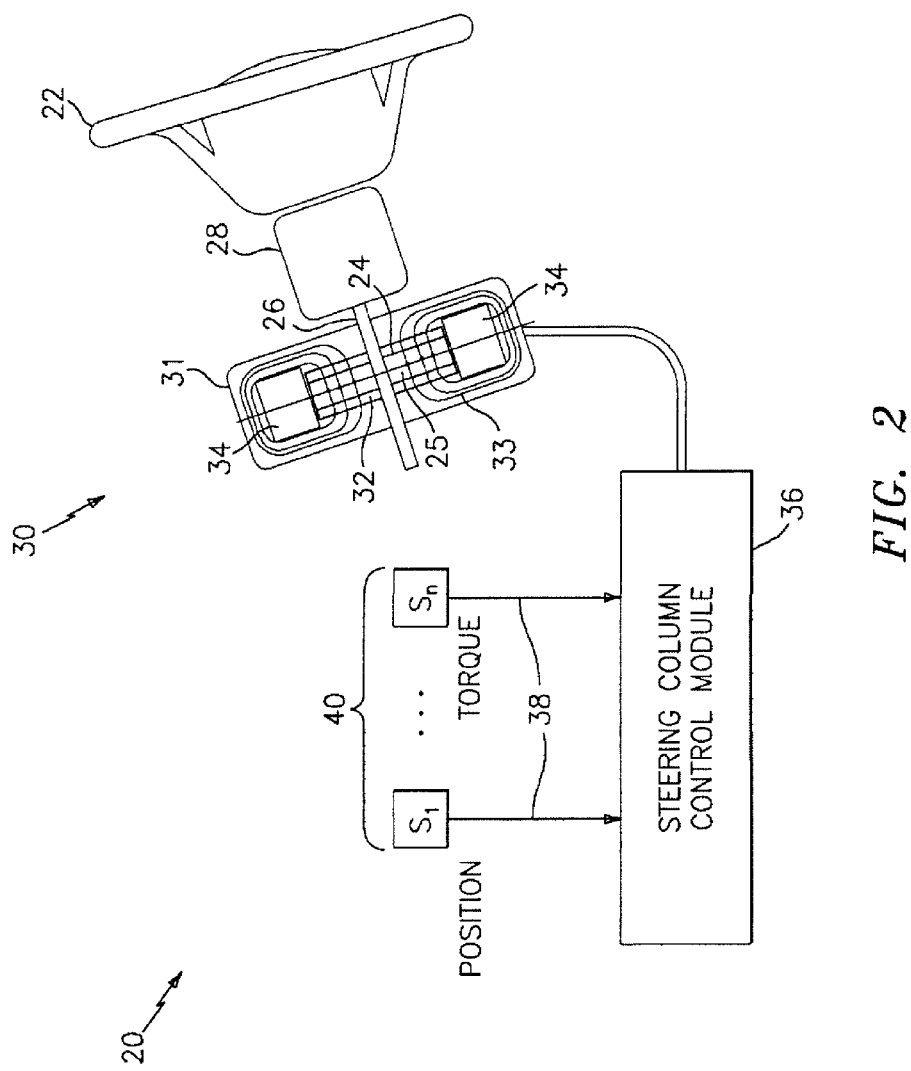
FIG. 2 is a schematic view of a variable road feedback device.

Turning now to FIG. 2, a variable road feedback device 20 for a steer-by-wire system is depicted. A steering wheel 22 is coupled to a magnetorheological ("MR") fluid device 30 via a steering shaft 26. In this exemplary embodiment, the MR fluid device 30 comprises a rotor 24 rotatably mounted within a housing 31 that is filled with a volume of MR fluid 32. The rotor 24 is positioned and shaped to be sensitive and responsive to the mechanical resistance or viscosity of the MR fluid 32. Such responsiveness may be achieved by providing vanes 25 or equivalent surfaces fixedly attached to the rotor so as to cause ever increasing resistance to free rotation thereof in response to increasing viscosity of the MR fluid. A cover member 28 is shown covering the steering shaft 26. The MR fluid 32 has a variable viscosity that is controlled by a magnetic field 33. A magnetic field generator is therefore provided, which may comprise a wire loop or coil 34 through which current is passed. A control module 36 preferably controls the current within the wire loop 34. The control module 36 will preferably receive signals 38 from a set of sensors 40. For example, the control module 36 may receive information from position sensors or torque sensors. In this embodiment, the set of sensors 40 is coupled to a set of wheels (not shown) of a vehicle (also not shown). The sensed information 38 is processed by the control module 36, which, in turn, causes the current within the wire loop 34 to vary. The variable current then causes varied viscosity or mechanical resistance of the MR fluid 32 contained within the housing 31. The variable resistance is then transferred to the rotor 24, which is mechanically coupled with the steering wheel 22. The vehicle operator feels the resistance to hand movements while gripping the steering wheel 22.

It is to be understood that the terms "steering wheel" and "road forces" are illustrative and may be generalized to other control devices such as yokes, joysticks, foot pedals and the like, and other feedback forces, such as flight or sea forces. Likewise, the controlled device may be in an actual vehicle or a simulator. For simulators and other similar applications, the control module would preferably have stored or recorded data to substitute for the signals that would otherwise have been supplied by the sensors. The stored data would be used to send signals to the MR device simulating road conditions.

Generally, a MR fluid comprises a fluid medium that has suspended magnetically sensitive particulates, such as ferrous particles or microspheres. When the fluid is in the presence of a magnetic field 33 the spheres tend to aggregate and thereby increase the viscosity of the suspension. The stronger the magnetic field 33, the stronger the aggregation until a point is reached where the aggregations may become so strong that the microspheres "lock up" and the fluid does not flow at all. Removal of the magnetic field 33 immediately permits the fluid to flow freely again.

Magnetorheological or "MR" fluids suitable for use in a variable road feedback device are disclosed in U.S. Pat. No. 5,896,965, issued Apr. 27, 1999, to Gopalswamy et al. for a Magnetorheological Fluid Fan Clutch; U.S. Pat. No. 5,848,678, issued Dec. 15, 1998, to Johnston et al. for a Passive Magnetorheological Clutch; U.S. Pat. No. 5,845,752, issued Dec. 8, 1998, to Gopalswamy et al. for a Magnetorheological Fluid Clutch with Minimized Resistance; U.S. Pat. No. 5,823,309, issued Oct. 20, 1998, to Gopalswamy et al. for a Magnetorheological Transmission Clutch; and U.S. Pat. No. 5,667,715, issued Sep. 16, 1997, to Foister, R. T. for Magnetorheological Fluids; the disclosures of all of which are incorporated herein by reference in their entirety.

Figure 3:
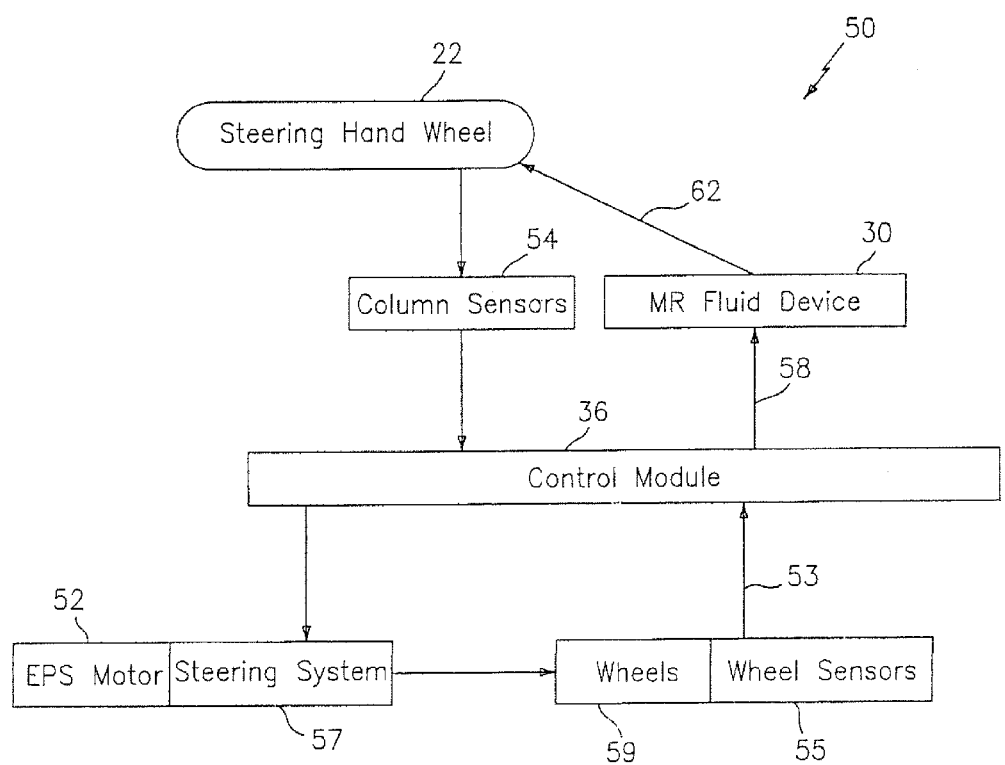
FIG. 3 is a schematic view of a variable road feedback device for a steer-by-wire system.

Referring now to FIG. 3, reference numeral 50 generally indicates a steer-by-wire system incorporating the variable road feedback device of FIG. 2, wherein the usage of the MR fluid device 30 is indicated.

In operation, a vehicle operator turns the steering wheel 22. The column sensors 54, included in the set of sensors 40 of FIG. 2, sense the desired information and send the information to a control module 36. The control module 36 sends a set of appropriate signals to the steering system 57. The steering system 57 is coupled to an EPS motor 52 to effectuate steering of the vehicle wheels 59.

A set of wheel sensors 55, included in the set 40 of FIG. 2, senses wheel feedback and inputs the sensed wheel feedback along line 53. The sensed information may include information such as the speed of the vehicle, the position of the wheels 59 indicating the theoretical or no-slip direction of vehicle movement, and the forces corresponding to interactions with the road surface while the vehicle is moving. The control module 36 takes the sensed information, and filters out a portion of unwanted feedback. The control module 36, in turn, sends filtered information along line 58 to the MR fluid device 30 depicted in FIG. 2. It is to be noted that the MR fluid device 30 provides virtually no resistance to a driving column, such as column 26 as shown in FIG. 2, when there is no magnetic force induced by the control module 36. However, when it becomes desirable to give the vehicle operator a feel of the road, the control module 36 energizes a magnetic field 33 in the MR fluid device 30 causing the MR fluid device 30, in turn, to provide variable resistance, as shown along line 62. The variable resistance, in turn, provides the vehicle operator with a feel of the road by transferring the resistance to the steering wheel 22. Thus, the vehicle operator "feels" or senses the road through the steering wheel 22. The variable road feedback device 20 uses the MR fluid device 30 to add the variable resistance to the steering wheel 22 in a drive-by-wire steering system in order to simulate the road feedback of a conventional mechanical steering system such as the one depicted in FIG. 1.

As can be appreciated, the steering system 57 has no mechanical link to the steering wheel 22. It follows that the vehicle operator would not have a sense or a "feel" of the road in the absence of the MR fluid device 30. The MR fluid device 30 provides a feedback to the vehicle operator by varying the resistance on the shaft 26 as shown in FIG. 2.

In another embodiment, the housing 31 containing the MR fluid 32 is placed further down the driving shaft 26 away from the steering wheel 22. Alternatively, another embodiment K may place the housing 31 closer to the steering wheel 22. The placement of the housing 31 is dependent upon the convenience in design and other suitable considerations. In addition, the location and the layout of the wire loop 34 may be altered in order to achieve a desired variation in magnetic field 33 of the MR fluid 32. Furthermore, suitable MR fluid 32 is chosen to accommodate a desired outcome, such as, for example, a desired range of variable resistance and a desired maximum transition period between variable resistance levels. For examples of different kinds of magnetorheological ("MR") fluids for serving the functions of the fluid 32, see U.S. Pat. No. 5,667,715 entitled Magnetorheological Fluids. However, the fluid 32 chosen shall not be limited to those disclosed by the above named patent, since any fluid having rapidly controllable viscosity may be substituted for performing the functions of the magnetorheological fluids disclosed therein.

This disclosure further contemplates that an alternate embodiment steer-by-wire system may have a back-up system with a mechanical link between the steering wheel 22 and the road wheels.

It shall be understood that a person of ordinary skill in the pertinent art may make modifications to the exemplary embodiment described herein without departing from the scope or intent of this disclosure. While the present disclosure has been described by means of example as carried out in a specific exemplary embodiment, the claims are not intended to be limited thereby but to cover the invention broadly within the scope and spirit of the disclosure as a whole.

What is claimed is:

1. A variable feedback device, comprising:
   a housing;
   a magnetorheological fluid contained within the housing;
   a magnetic field generator coupled to the housing and adapted to produce a magnetic field within the magnetorheological fluid and vary a viscous resistance of the fluid; and
   a rotor rotatably mounted within the housing for rotation through the magnetorheological fluid, the rotor including a plurality of vanes fixedly attached to the rotor, the vanes being configured such that the rotor is responsive to the variable viscous resistance of the magnetorheological fluid.

2. The device of claim 1 wherein the magnetic field generator further comprises a control module for controlling the magnetic field.

3. The device of claim 2 wherein the control module processes a plurality of input signals received from a plurality of sensors.

4. The device of claim 2 wherein the control module processes at least one input signal from stored data.

5. The device of claim 3 wherein the input signals comprise information corresponding to at least one of position and torque.

6. The device of claim 1 wherein the rotor is coupled to a steering wheel.

7. A steer-by-wire system for a vehicle, the system comprising:
   a plurality of sensors for generating a plurality of input signals, comprising at least one column sensor for sensing changes in at least one of position and torque of a steering wheel and comprising a plurality of wheel sensors for sensing changes in at least one of position and torque of a plurality of steerable vehicle wheels;

an electrical power steering motor coupled to a vehicle steering system for assisting a vehicle operator; and a housing containing:
  a magnetorheological fluid;
  a magnetic field generator adapted to produce a magnetic field within the magnetorheological fluid and vary a viscous resistance of the fluid; and
  a rotor rotatably mounted within the housing in contact with the magnetorheological fluid wherein the rotor includes a plurality of vanes fixedly attached to the rotor, the vanes being positioned and shaped to be sensitive and responsive to the viscous resistance of the magnetorheological fluid.

8. The system of claim 7, further comprising:
a control module adapted to process the plurality of input signals from the plurality of sensors to generate a signal for varying the viscous resistance of the magnetorheological fluid.

9. The system of claim 7 wherein the magnetic field generator further comprises a control module for controlling the intensity of the magnetic field.

10. The system of claim 9 wherein the control module processes a plurality of input signals received from a set of sensors.

11. The system of claim 10 wherein the plurality of input signals comprises information corresponding to at least one of position and torque.

12. The system of claim 7 wherein the rotor is coupled to a steering wheel.

13. A method for generating a variable viscous resistance within a housing, which contains therein a magnetorheological fluid and a rotor, whereby a vehicle operator feels resistance while turning a steering wheel, the method comprising:

sensing a plurality of input signals with a plurality of sensors;

generating a variable magnetic field within the housing in accordance with the sensed plurality of input signals;

varying a viscosity of the magnetorheological fluid in accordance with the generated magnetic field; and increasing resistance to rotation of the rotor through an interaction of a plurality of vanes fixedly attached to the rotor with the varied viscosity of the magnetorheological fluid to thereby provide feedback to the vehicle operator through the steering wheel.

14. The method of claim 13 wherein the sensing further comprises:
sensing at least one first input signal from at least one wheel sensor; and
sensing at least one second input signal from at least one column sensor.

15. A variable road feedback steer-by-wire system for a vehicle, the system comprising:
a steering column;
a plurality of sensors including one or more column sensors and one or more road wheel sensors, said column sensors being configured to generate first input signals indicative of changes in position and/or torque of said steering column, said road wheel sensors being configured to generate second input signals indicative of changes in position and/or torque of one or more steerable road wheels of said vehicle;
a rotor secured to said steering column such that rotation of said steering column causes a corresponding rotation of said rotor;
a housing disposed about said rotor, said housing containing a magnetorheological fluid such that said rotor is rotatable through said magnetorheological fluid;
a magnetic field generator for selectively producing a magnetic field within said magnetorheological fluid based upon said first and second input signals, said magnetic field being sufficient to vary a viscosity of said magnetorheological fluid; and
a plurality of vanes fixedly attached to the rotor, said plurality of vanes being positioned and shaped to be sensitive and responsive to said viscosity.

16. The system as in claim 15, wherein said steering column is coupled to a steering wheel such that a vehicle operator feels resistance to rotation of said steering wheel caused by varying said viscosity.

17. The system as in claim 16, further comprising:
a control module adapted to process said first and second input signals and to generate an output signal for varying said viscosity in response to said first and second input signals.

18. The system as in claim 17, wherein said output signal varies said viscosity by varying a current within said magnetic field generator.

19. The system as in claim 18, wherein said control module is further adapted to filter out a portion of said first and second input signals, said portion being indicative of an amount of unwanted feedback such that said output signal is a filtered output signal.

* * * * *